US005770926A

United States Patent [19]

Choi et al.

[11] Patent Number: 5,770,926

[45] Date of Patent: Jun. 23, 1998

[54] FEEDBACK CONTROL SYSTEM OF AN ELECTRONIC BALLAST WHICH DETECTS ARCING OF A LAMP

[75] Inventors: Nak-Choon Choi; Maeong-Ho Seo, both of Kyungki-do, Rep. of Korea

[73] Assignee: Samsung Electronics, Co., Ltd., Kyungki-do, Rep. of Korea

[21] Appl. No.: 774,507

[22] Filed: Dec. 30, 1996

[30] Foreign Application Priority Data

Dec. 28, 1995 [KR] Rep. of Korea .................. 1995-61847

[51] Int. Cl.[6] .................................................. G06F 1/00

[52] U.S. Cl. .................... 315/307; 315/224; 315/209 R; 315/106; 315/DIG. 7

[58] Field of Search .................................... 315/234, 307, 315/209 R, 308, 106, DIG. 4, 360, DIG. 7

[56] References Cited

U.S. PATENT DOCUMENTS

| | | | |
|---|---|---|---|
| 4,723,098 | 2/1988 | Grubbs | 315/106 |
| 4,933,605 | 6/1990 | Quazi et al. | 315/224 |
| 5,315,214 | 5/1994 | Lesea | 315/209 R |
| 5,546,300 | 8/1996 | Lee et al. | 315/208 R |
| 5,648,702 | 7/1997 | Choi et al. | 315/224 |

*Primary Examiner*—Robert Pascal
*Assistant Examiner*—Haissa Philogene
*Attorney, Agent, or Firm*—Marger, Johnson, McCollom & Stolowitz, PC

[57] ABSTRACT

The present invention relates to a feedback control system and method for controlling an electronic ballast for driving a lamp where the lamp requires preheating of a cathode of the lamp in order for the electronic ballast to successfully discharge into the lamp and initiate arcing operation in the lamp. The system detects the power consumption level of the lamp and, when the power consumption level indicates that the lamp is not arcing, performs a restart of the lamp wherein the restart function includes preheating the cathode with a preheating current. The present invention reduces production cost and increases safety by detecting operation in the lamp without using external elements.

12 Claims, 3 Drawing Sheets

FEEDBACK CONTROL SYSTEM OF AN ELECTRONIC BALLAST WHICH DETECTS ARCING OF A LAMP

BACKGROUND OF THE INVENTION

1. Field of the Invention

The present invention relates to a feedback control system for an electronic ballast which detects the power consumption of a lamp driven by the electronic ballast and, more particularly, relates to a feedback control system for an electronic ballast which detects the power consumption of the lamp without using external elements.

2. Description of the Prior Art

FIG. 1 is a drawing illustrating a conventional electronic ballast which comprises a resonant current detection circuit used for detecting operation of the lamp.

As shown in FIG. 1, the conventional electronic ballast includes two switching transistors M1 and M2 connected in series with one another. Transistor M1 is connected in parallel with diode D1 and transistor M2 is connected in parallel with diode D2. Capacitors C1 and C2 are connected in series with one another and in parallel with transistors M1 and M2, respectively. Capacitors C4 and C5 are also connected in series with one another and in parallel with transistors M1 and M2. An inductor Lr, a resonance detector 11 and a lamp are connected in series between the common point of contact between capacitors C1 and C2 and the common point of contact between capacitors C4 and C5. Capacitor C3 is connected to both ends of a lamp.

The conventional electronic ballast detects the operation of the lamp by an increase of the resonance current transmitting through the resonance current detector 11. However, changes in the amount of current which is generated when the input voltage (Vdd) varies or when the lamp load changes are also reflected in the resonance current through the resonance current detector 11 and must be considered when detecting changes in the current. As a consequence, conventional devices which detect lamp operation by monitoring the resonance current in detector 11 have the problem that the exact comparison point for the resonance current must be precisely adjusted in each electronic ballast set because the limited current detection width must be determined on the basis of the result of complex experiments.

Another problem with conventional electronic ballasts arises when the ballast proceeds to discharge into the lamp before the lamp is adequately preheated, which will result in the lamp failing to illuminate. A cathode of the lamp must typically be preheated before the ballast discharges current into the lamp in order to initiate arcing in the vapor inside the lamp which results in fluorescent operation of the lamp. Insufficient preheating of the ballast typically results because the temperature of the air surrounding the lamp is too cold when the electronic ballast is induced to discharge.

SUMMARY OF THE INVENTION

Accordingly, the object of the present invention is to provide a feedback control system for an electronic ballast which detects the operation of a lamp without using external elements and which resumes preheating of the lamp if a discharge to the lamp fails.

An embodiment of a feedback control system for an electronic ballast which drives a lamp, according to the present invention, includes a multiplier configured to output a first signal which is proportional to the product of a power signal and a feedback signal from the electronic ballast, a preheating controller configured to output a preheating current, for preheating the lamp, responsive to a preheating control signal. An adder is configured to produce a second signal corresponding to the sum of the first signal and the preheating current,and a restart and time controller is configured to output the preheating control signal responsive to the second signal. A first difference amplifier provides a third signal which corresponds to the difference between a first reference voltage and the second signal; a transconductance circuit is configured to output a fourth signal which corresponds to the third signal, and a second difference amplifier is configured to output a sixth signal which corresponds to the difference between the fourth signal and a second reference signal, wherein the second reference signal corresponds to a standard operational current of the electronic ballast, and a fifth signal, wherein the fifth signal corresponds to the power signal. An oscillator & output driver is configured to generate a control frequency to be output to the electronic ballast, wherein the control frequency corresponds to the sixth signal.

A restart and time controller according to an embodiment of the present invention includes an arcing detection comparator configured to compare a first reference signal and a feedback signal, wherein the feedback signal corresponds to the current consumption of the lamp. The restart and time controller also outputs an arcing signal which indicates when arcing is occurring in the lamp. The controller includes a latch wherein the set input terminal receives the arcing signal and wherein the output terminal outputs a restart signal indicating whether the lamp must be preheated. A time controller receives the restart signal and, responsive thereto, outputs a ramping voltage signal and a preheating control signal, wherein the preheating control signal is configured to cause a preheating controller to generate a preheating current. A first comparator is configured to compare the ramping voltage signal to a third reference signal and output a first reset signal responsive thereto. A second comparator compares the ramping voltage signal to a fourth reference signal and outputs a second reset signal responsive thereto, wherein the voltage level of the fourth reference signal is greater than the voltage level of the third reference signal. An OR-gate has an output terminal coupled to a reset terminal of the latch, a first input terminal which receives the first reset signal and a second input terminal which receives the second reset signal and, further, wherein the second input terminal is coupled to an inverting output terminal of the latch.

An embodiment of a method for controlling a preheating current in an electronic ballast which drives a lamp, according to the present invention, includes multiplying a feedback current from the electronic ballast by the supply voltage to produce a first current signal. The method includes summing the first current signal with the preheating current generated by a preheating controller to produce a second current signal, transforming the second current signal into a first voltage signal, and amplifying the difference between a first reference voltage and the first voltage signal to produce an error voltage signal, wherein the first reference voltage corresponds to a standard operating voltage for the lamp. The error voltage is then amplified to produce an amplified error current signal which is then integrated to produce an integrated voltage signal. The integrated voltage signal is then converted to an integrated current signal. Then the difference between a reference current and a power current signal, on the one hand, and the integrated current signal is amplified to produce a total current signal, wherein the reference current corresponds to a standard operating current of the lamp, and wherein the power current signal is proportional to the supply voltage. A control frequency, which corresponds to the total current signal, is then generated and used for driving the electronic ballast. Finally, the method includes controlling the preheating current generated by a preheating controller responsive to the first reference voltage and the first voltage signal.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate one embodiment of the invention and, together with the description, serve to explain the principles of the invention.

In the drawings.

DESCRIPTION OF THE PREFERRED EMBODIMENT

Figure 2:
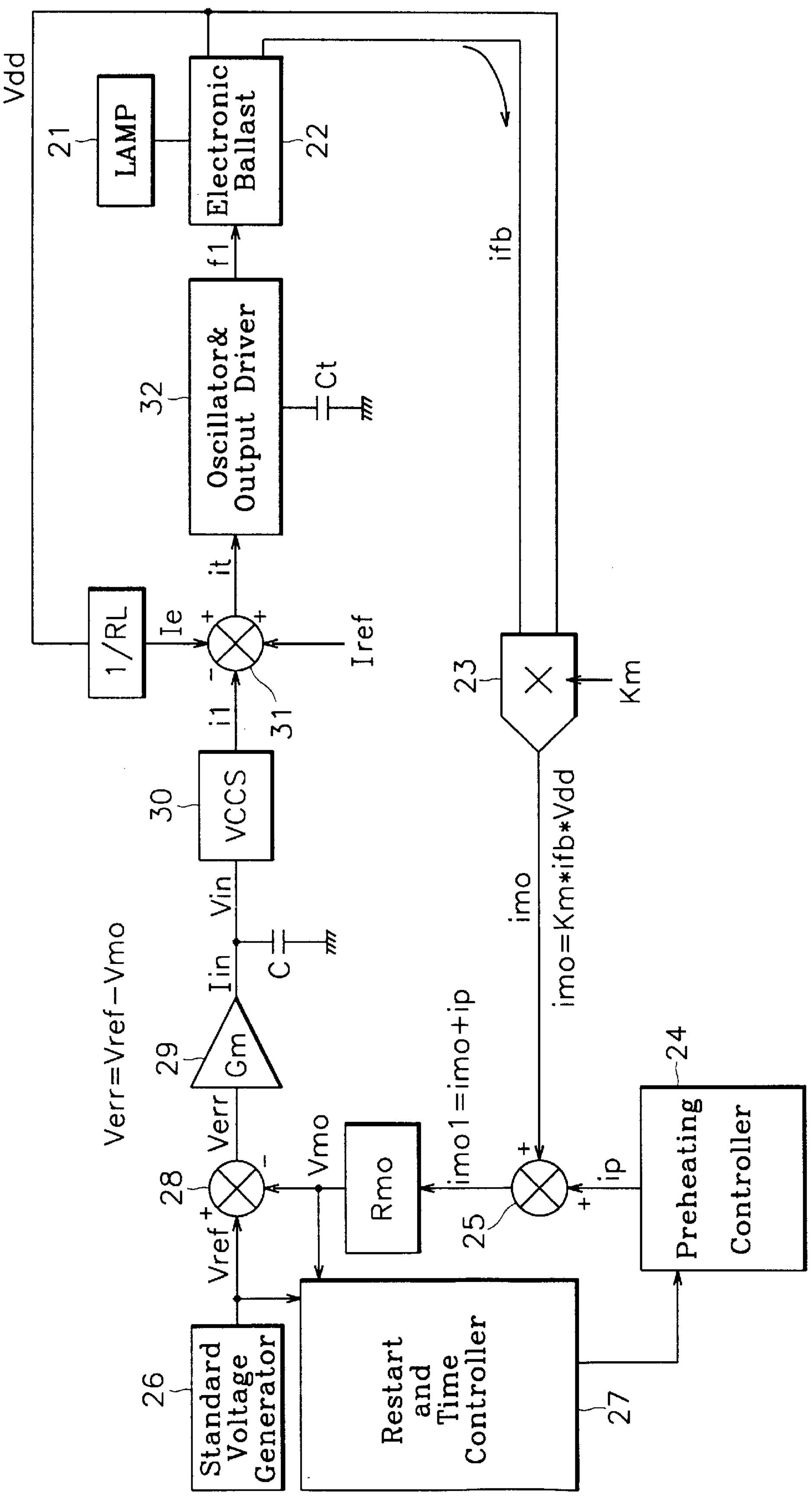
FIG. 2 is a block diagram illustrating a feedback control system of an embodiment of an electronic ballast according to the present invention which includes a restart and time controller.

FIG. 2 is a block diagram illustrating an embodiment of the feedback control system for an electronic ballast of the present invention. The feedback control system drives an electronic ballast 22 which, in turn, drives a lamp 21. The electronic ballast 22 generates an output to the lamp for preheating at an early stage of operation of the ballast, produces a momentary discharge into the lamp, and maintains discharge to the lamp 21. Electronic ballast 22 also outputs a power voltage Vdd and a feedback current ifb for feedback control.

A multiplier 23 receives Vdd and ifb from electronic ballast 22 and outputs a current signal imo which is proportional to the product of Vdd and ifb (i.e. imo=Km*ifb*Vdd). Adder 25 receives imo from multiplier 23 and adds imo to a preheating current signal ip, output from a preheating controller 24, to produce current signal imol. Preheating controller 24 outputs the current ip in order to perform a preheating cycle for lamp 21.

A standard voltage generator 26 outputs a reference voltage (Vref) for comparison to the feedback control voltage Vmo, which is produced by resistive block Rmo in response to current signal imo. Restart and time controller 27 receives Vmo and Vref and outputs a preheating control signal to the preheating controller 24 in order to output the preheating control current ip for the preheating cycle performed by preheating controller 24.

A first difference amplifier 28 receives Vref and Vmo and outputs a resulting error signal Verr which is proportional to the difference between Vref and Vmo. Error amp 29 amplifies the error signal Verr and outputs current signal Iin which is integrated by capacitor C to produce voltage signal Vin. Voltage controlled current source (VCCS) 30 then outputs current i1 in response to voltage Vin.

A second difference amplifier 31 receives i1 output from VCCS 30, reference current Iref, and current signal le, where le is obtained from resistive block 1/RL in response to Vdd output from electronic ballast 22. Difference amplifier 31 produces a current signal (it), wherein it=(Iref+le)-i1. Current signal (it) then drives oscillator & output driver 32 which produces a control frequency f1 that is output to electronic ballast 22. The control frequency f1 is determined by the rate that the total current signal (it) charges capacitor Ct connected to oscillator & output driver 32.

Figure 1:
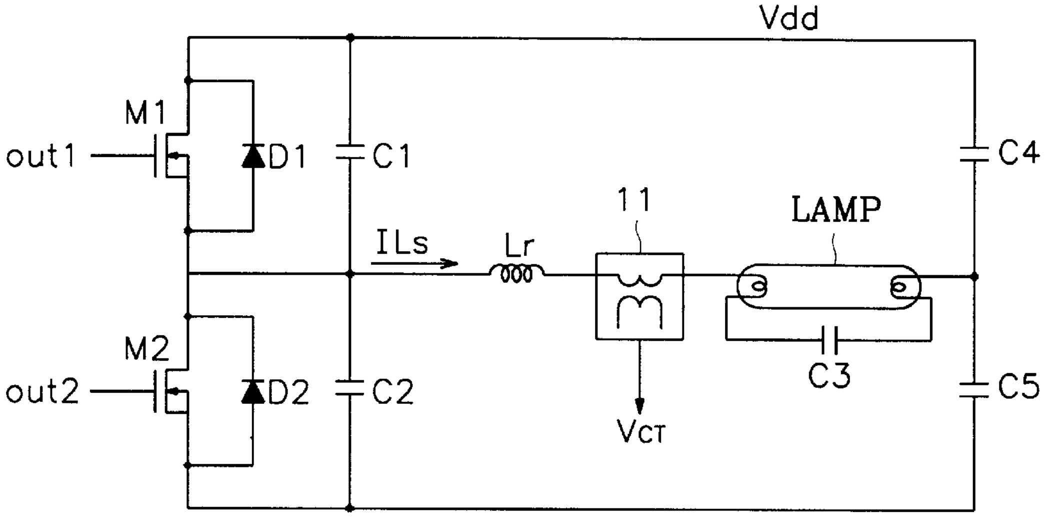
FIG.1(Prior Art)
FIG. 1 is a schematic diagram of a conventional electronic ballast that includes a resonance current detector for lamp operation detection.
Figure 3:
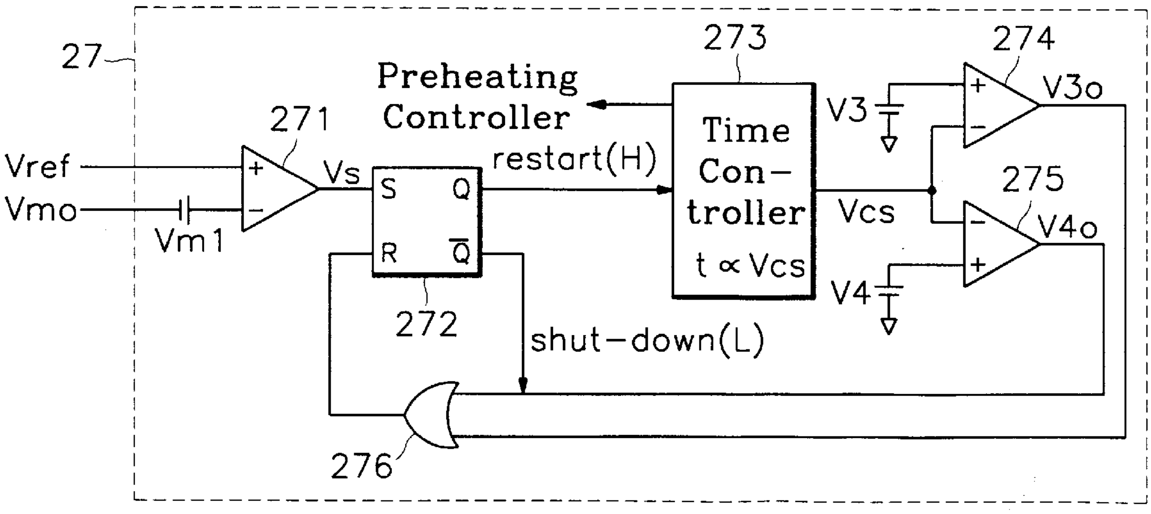
FIG. 3 is a schematic diagram of the restart and time controller of FIG. 2.

FIG. 3 illustrates an embodiment of the restart and time controller 27 of FIG. 2. The restart and time controller 27 includes an arcing detection comparator 271 that outputs a signal Vs which indicates whether the lamp 21 is operating by comparing Vref to VmO plus a step up voltage Vml. RS latch 272 receives Vs at its S terminal and outputs a restart signal restart(H), from its Q terminal, which indicates whether preheating has been performed, and a shut-down signal shut-down(L), output from the QB terminal, which suppresses the feedback of a signal V4o internal to controller 27.

Controller 27 also includes time controller 273 which receives the restart(H) signal output from RS latch 272 and, in response, generates a signal Vcs that is related to a first predetermined period (i.e. time periods t0 to t3 or t1 to t3 in FIG. 4) and also related to a second predetermined time period (i.e. t3 to t4) during which the preheating current signal ip is produced responsive to restart(H). Reset comparator 274 receives reference voltage V3 at its positive terminal and receives Vcs at its negative input terminal in order to produce signal V3o, which is active high to determine the time period for a preheating operation. Another comparator 275 receives reference voltage V4 at its positive input terminal and Vcs at its negative input terminal in order to output the signal V40 which is active low to determine the time (i.e. t3 to t4) when time controller 273 operates responsive to Vs.

The output terminal of an OR-gate 276 is connected to the reset terminal R of RS latch 272. OR-gate 276 performs a logical sum of V3o and V4o in order to produce the reset signal for the RS latch.

Operation of the circuit illustrated in FIGS. 2 and 3 begins when power voltage Vdd is applied to the circuit. Multiplier 23 combines the current ifb, which reflects the current consumption of electronic ballast 22, and the power voltage Vdd supplied to the electronic ballast 22 to produce current signal imo (imo=Km*ifb*Vdd). Adder 25 sums the preheating current ip and imo to produce imo1, which is transformed into Vmo in resistive block Rmo and input to restart and time controller 27. During an initial start-up operation after Vdd is first applied to the circuit, such as the time period from t0 to t1, V3o will disable time controller 273 to permit preheating controller 24 to perform the initial preheating operation. Next, difference amplifier 28 receives Vmo and Vref to determine error voltage, Verr=Vref−Vmo, which is output to error amp 29.

Error amp 29 is a transconductance device having gain Gm which amplifies the error voltage Verr and outputs current Iin that is integrated by capacitor C to produce integrated voltage Vin. Vin is changed into current i1 by VCCS 30. Difference amplifier 31 then compares reference current Iref, which corresponds to a predetermined standard operating frequency, and power feedback current Ie, which is derived from power voltage Vdd, to i1 in order to produce total current (it) which is output to oscillator & output driver 32.

Total current (it) is used by the oscillator & output driver 32 to charge capacitor Ct in order to generate a frequency signal f1 which controls the power consumption of electronic ballast 22.

The frequency f1 is shown in formula 1 below. The frequency is expressed as a function of ΔV in formula 1 because the electronic ballast 22 has a half bridge pattern and therefore has two output patterns which are alternated.

$$2f = it/(Ct * \alpha V) \quad (1)$$

When the preheating current ip output from preheating controller 24 is under the control of time controller 273, an increase in the preheating current ip will result in a corresponding decrease in the feedback current ifb output from electronic ballast 22. A decrease in current ifb results in preheating of lamp 21.

Figure 4:
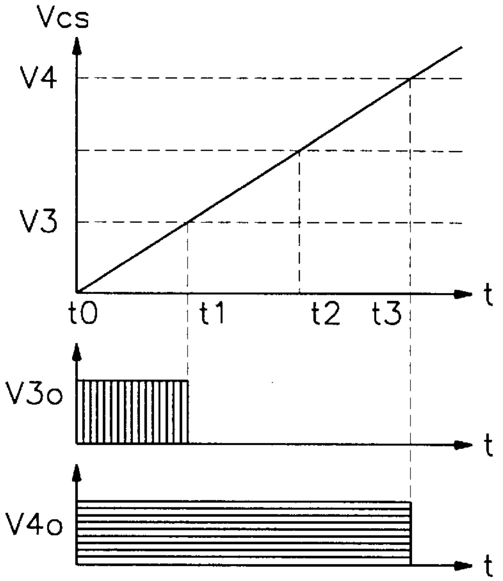
FIG. 4 is a graph showing waveforms illustrating the relationship between internal voltage waveforms Vcs, V3o and V4o of the restart and time controller of FIG. 3.
Figure 5:
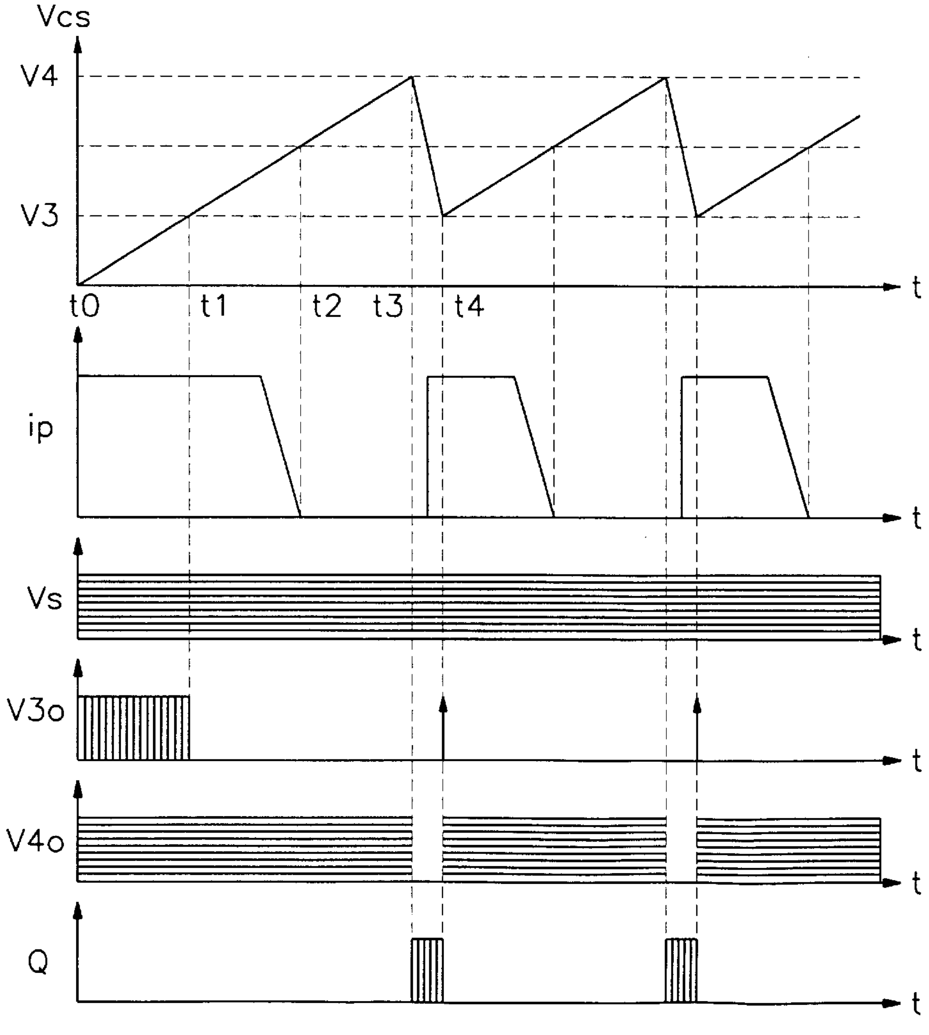
FIG. 5 is a graph sequentially showing the internal waveforms of the restart and time controller of FIG. 3 for a preheating mode of the restart and time controller.

To further illustrate the function of the present feedback system, FIGS. 4 and 5 are partial waveform diagrams for the restart and time controller 27. As described above, time controller 273 outputs voltage Vcs, which ramps over time t. Vcs is input to the negative input terminals of reset comparator 274 and comparator 275. The output of the reset comparator 274 is the voltage signal V3o and the output of the comparator 275 is the voltage signal V4o. V3 and V4 are predetermined reference voltages. V3 is selected such that Vcs will reach V3 while preheating current ip is still being generated in order to determine a reset time for time controller 273 which is responsive to an active restart signal restart(H). V4 is selected such that Vcs reaches V4 after the preheating cycle has completed. FIG. 4 illustrates the relationship between Vcs and the control signals V3o and V4o over time.

During a normal starting operation, such as the period t0 to t1 in FIGS. 4 and 5, the control signals V30 and V40 are at a logic high level (H). Accordingly, the restart signal restart(H) signal, which controls any additional preheating cycles that will be necessary if the lamp fails to operate, is forced to a logic low level, independent of the output of arcing detection comparator 271, because V3o and V4o propagate through OR-gate 276 to the reset terminal R of RS latch 272. Thus, RS latch 272 is reset in the period from t0 to t1. In the period t1 to t3, restart(H) is forced low because V4o is at a high level. The initial preheating cycle ends at t2 when the preheating current ip output from the preheating controller 24 drops to 0, as shown in FIG. 5.

Time t3 is the time when discharge detection occurs in restart and time controller 27. The time interval from t3 to t4 is when time controller 273 is under the control of restart(H). During a normal operating condition (i.e. when Vref<Vmo+Vm 1), restart(H) does not become active after t3 because Vs output from arcing detection comparator 271 is at a low level (L). If the lamp operates normally, then no restart(H) signal is necessary for another preheating cycle and no signal is output from time controller 273 to preheating controller 24. Note here that voltage Vm1 is added to Vmo at the input of comparator 271 in order to level shift Vmo.

If the lamp fails to operate and no arcing is taking place, then Vref>Vmo+Vm1. The operation of the feedback system up until time t3 is similar to that described above for normal operation. However, when the lamp fails to arc, the Vs signal output from arcing detection comparator 271 becomes high and is input to the S terminal of RS latch 272, so long as the output of OR-gate 276 is a low value (that is to say, V3o and V4o are low). As a result, an active restart(H) signal is output from the Q terminal of the RS latch 272 to the time controller 273 causing the time controller 273 to ramp down the output voltage (Vcs) to a lower value, as shown in FIG. 5. At the same time that restart(H) is active, the QB terminal of RS latch 272 outputs an active shut-down(L) signal which prevents RS latch 272 from being reset by V4o by pulling down the voltage at the output of the comparator 275 from a logic high value (H) to a logic low value (L). Accordingly, the drop in the output voltage Vcs from time controller 273 caused by the restart(H) signal continues while reset comparator 274 compares Vcs to V3. When Vcs reaches V3 at t4, the reset comparator 274 generates a spike in V3o which propagates through OR-gate 276 and resets RS latch 272. As a result, the restart(H) signal is reset to a low value (L) and time controller 273 transmits the signal to preheating controller 24 to perform a preheating cycle. Thus, the preheating operation is performed and preheating current ip is output. Also, when V3o resets RS latch 272 at t4, voltage Vcs is permitted to ramp up again so that the preheating operation can be repeated, if necessary.

The preferred embodiment of the present invention as described above shows a feedback control system for an electronic ballast which saves production cost and increases safety by detecting the arcing operation of a lamp without using external elements and which resumes a preheating mode if a discharge to the lamp fails due to insufficient preheating.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A feedback control system for an electronic ballast which drives a lamp, the feedback control system comprising:

a multiplier configured to receive a feedback signal from the electronic ballast and a power signal to output a first signal which is proportional to the product of the power signal and the feedback signal;

a preheating controller configured to receive a preheating control signal and further configured to output a preheating current, for preheating the lamp, responsive to the preheating control signal;

an adder configured to receive the first signal and the preheating current and produce a second signal corresponding to the sum of the first signal and the preheating current;

a restart and time controller configured to receive the second signal and a first reference signal, wherein the first reference signal corresponds to a standard operating voltage of the electronic ballast, and further configured to output the preheating control signal responsive to the second signal;

a first difference amplifier configured to receive the first reference voltage and the second signal and output a third signal which corresponds to the difference between the first reference voltage and the second signal;

a transconductance circuit configured to receive the third signal, amplify the third signal, integrate the third signal and output a fourth signal which corresponds to the third signal;

a second difference amplifier configured to receive the fourth signal, a second reference signal, wherein the second reference signal corresponds to a standard operational current of the electronic ballast, and a fifth signal, wherein the fifth signal corresponds to the power signal, and output a sixth signal, wherein the sixth signal corresponds to the difference between the sum of the second reference signal and the sixth signal, on one hand, and the fourth signal; and an oscillator & output driver configured to receive the sixth signal and coupled to the electronic ballast, wherein the oscillator & output driver is further configured to generate a control frequency to be output to the electronic ballast, wherein the control frequency corresponds to the sixth signal.

2. The feedback control system of claim 1 wherein the transconductance circuit further comprises:

an error amplifier configured to receive the third signal and output an amplified signal which is proportional to the third signal;

a capacitor which integrates the amplified signal and changes the amplified signal into an integrated voltage signal; and a VCCS that receives the integrated voltage signal and outputs the fourth signal responsive to the integrated voltage signal.

3. The feedback control system of claim 2, wherein the oscillator and output driver includes a capacitor which is charged by sixth signal output from the second difference amplifier.

4. The feedback control system of claim 1, wherein the restart and time controller further comprises:

an arcing detection comparator configured to receive the first reference signal and the second signal and output an arcing signal which indicates when arcing is occurring in the lamp;

a latch having a set input terminal, a reset input terminal, an output terminal and an inverted output terminal, wherein the set input terminal receives the arcing signal, and wherein the output terminal outputs a restart signal indicating whether the lamp must be preheated;

a time controller that receives the restart signal and, responsive thereto, outputs a ramping voltage signal and the preheating control signal;

a first comparator configured to compare the ramping voltage signal to a third reference signal and output a first reset signal responsive thereto;

a second comparator configured to compare the ramping voltage signal to a fourth reference signal and output a second reset signal responsive thereto, wherein the voltage level of the fourth reference signal is greater than the voltage level of the third reference signal; and an OR-gate having first and second input terminals and an output terminal, wherein the first input terminal receives the first reset signal and the second input terminal receives the second reset signal and further wherein the second input terminal is coupled to the inverting output terminal of the latch, and where the output terminal of the OR-gate is coupled to the reset terminal of the latch.

5. The feedback control system of claim 4, wherein the voltage level of the third reference signal is selected such that the ramping voltage reaches the voltage level of the third reference signal before the preheating controller stops generating the preheating current.

6. The feedback control system of claim 5, wherein the voltage level of the fourth reference signal is selected such the ramping voltage reaches the voltage level of the third reference signal after the preheating controller stops generating the preheating current.

7. The feedback control system of claim 6, wherein the time controller generates the preheating control signal when the ramping voltage becomes lower than the voltage level of the third reference signal.

8. A restart and time controller for use in a feedback control system for an electronic ballast that drives a lamp, the restart and time controller comprising:

an arcing detection comparator configured to receive a first reference signal and a feedback signal, wherein the feedback signal corresponds to the current consumption of the lamp, and output an arcing signal which indicates when arcing is occurring in the lamp;

a latch having a set input terminal, a reset input terminal, an output terminal and an inverted output terminal, wherein the set input terminal receives the arcing signal, and wherein the output terminal outputs a restart signal indicating whether the lamp must be preheated;

a time controller that receives the restart signal and, responsive thereto, outputs a ramping voltage signal and a preheating control signal, wherein the preheating control signal is configured to cause a preheating controller to generate a preheating current;

a first comparator configured to compare the ramping voltage signal to a third reference signal and output a first reset signal responsive thereto;

a second comparator configured to compare the ramping voltage signal to a fourth reference signal and output a second reset signal responsive thereto, wherein the voltage level of the fourth reference signal is greater than the voltage level of the third reference signal; and an OR-gate having first and second input terminals and an output terminal, wherein the first input terminal receives the first reset signal and the second input terminal receives the second reset signal and further wherein the second input terminal is coupled to the inverting output terminal of the latch, and where the output terminal of the OR-gate is coupled to the reset terminal of the latch.

9. A method for controlling a preheating current in an electronic ballast which drives a lamp, the method comprising the steps of:

multiplying a feedback current from the electronic ballast by the supply voltage to produce a first current signal;

summing the first current signal with the preheating current generated by a preheating controller to produce a second current signal;

transforming the second current signal into a first voltage signal;

amplifying the difference between a first reference voltage and the first voltage signal to produce a error voltage signal, wherein the first reference voltage corresponds to a standard operating voltage for the lamp;

amplifying the error voltage signal to produce an amplified error current signal;

integrating the amplified error current signal to produce an integrated voltage signal;

converting the integrated voltage signal to an integrated current signal;

amplifying the difference between a reference current and a power current signal, on the one hand, and the integrated current signal to produce a total current signal, wherein the reference current corresponds to a standard operating current of the lamp, and wherein the power current signal is proportional to the supply voltage;

generating a control frequency corresponding to the total current signal;

driving the electronic ballast with the control frequency; and controlling the preheating current generated by a preheating controller responsive to the first reference voltage and the first voltage signal.

10. The method of claim 9, wherein the step of controlling the preheating current generated by a preheating controller further comprises the steps of:

comparing the first reference voltage to the first voltage signal in order to generate a set signal when the first reference voltage is greater than the first voltage signal;

setting a restart signal to a first logic level responsive to the set signal;

generating a ramping voltage which increases in response to the first logic level of the restart signal and decreases in response to a second logic level of the restart signal;

comparing the ramping voltage to a second reference voltage in order to produce a first reset signal;

comparing the ramping voltage to a third reference voltage in order to produce a second reset signal;

forcing the second reset signal to be inactive when the restart signal is active;

resetting the restart signal responsive to either of the first and second reset signals is active; and starting a preheating cycle when the restart signal becomes active, wherein the preheating cycle generates the preheating current for a predetermined time period.

11. The method of claim 10, wherein:

the step of comparing the ramping voltage to a second reference voltage includes selecting the second reference voltage such that when the ramping voltage is increasing, the ramping voltage will reach the second reference voltage while the preheating current is being generated; and the step of comparing the ramping voltage to a third reference voltage includes selecting the third reference voltage such that when the ramping voltage is increasing, the ramping voltage will reach the third reference voltage after the preheating current is no longer being generated.

12. The method of claim 10, wherein the step of setting a restart signal responsive to the set signal includes setting the restart signal responsive to the set signal only when both the first and second reset signals are inactive.

* * * * *

UNITED STATES PATENT AND TRADEMARK OFFICE

CERTIFICATE OF CORRECTION

PATENT NO. : 5,770,926
DATED : June 23, 1998
INVENTOR(S) : Choi et al.

It is certified that error appears in the above-identified patent and that said Letters Patent is hereby corrected as shown below:

Column 4,
Lines 7, 8, and 10, "1E" should read -- Ie --;

Column 5,
Line 15, "$2f=it/(Ct*\alpha V)$" should read -- "$2fl = it/(Ct * \Delta V)$ ------ (1)" --.

Signed and Sealed this

Twelfth Day of February, 2002

*Attest:*

JAMES E. ROGAN
*Director of the United States Patent and Trademark Office*

*Attesting Officer*